US006837339B2

(12) United States Patent
Lees

(10) Patent No.: US 6,837,339 B2
(45) Date of Patent: Jan. 4, 2005

(54) SELF-LEVELING SUPPORT

(75) Inventor: Sydney John Lees, Walsall (GB)

(73) Assignee: Wheelsure Technologies Limited, Bedfordshire (GB)

( * ) Notice: Subject to any disclaimer, the term of this patent is extended or adjusted under 35 U.S.C. 154(b) by 0 days.

(21) Appl. No.: 10/380,436

(22) PCT Filed: Sep. 21, 2001

(86) PCT No.: PCT/GB01/04214

§ 371 (c)(1), (2), (4) Date: Mar. 14, 2003

(87) PCT Pub. No.: WO02/25049

PCT Pub. Date: Mar. 28, 2002

(65) Prior Publication Data

US 2003/0188927 A1 Oct. 9, 2003

(30) Foreign Application Priority Data

Sep. 22, 2000 (GB) .......................................... 0023292

(51) Int. Cl.[7] .......................... E06C 1/00; F16M 11/24

(52) U.S. Cl. .................................. 182/200; 248/188.2

(58) Field of Search ............................... 182/200, 201, 182/202, 203, 204; 248/188.2, 188.3

(56) References Cited

U.S. PATENT DOCUMENTS

| | | | | |
|---|---|---|---|---|
| 1,516,988 A | * | 11/1924 | Redman | ..................... 182/202 |
| 3,027,969 A | | 4/1962 | Erickson | |
| 3,037,581 A | | 6/1962 | Feltrop | |
| 3,233,702 A | | 2/1966 | Feltrop | |
| 4,243,122 A | * | 1/1981 | Coutts | ........................ 182/200 |

FOREIGN PATENT DOCUMENTS

| | | |
|---|---|---|
| FR | 1.232.330 | 10/1960 |
| GB | 2 037 357 | 7/1980 |

* cited by examiner

*Primary Examiner*—Hugh B. Thompson, II
(74) *Attorney, Agent, or Firm*—Keusey, Tutunjian & Bitetto, P.C.

(57) ABSTRACT

A self-leveling support includes a first stile (1) and a second stile (2), a first leg member (6) and a second leg member (7), each having an elongate element adapted to move longitudinally relative to one of the stiles (1, 2), a spacer (3) adapted to secure the stiles (1, 2) substantially parallel to each other, and a cross member (8) adapted to pivot about a pivot pin (9) acting in a guide (10) in the spacer (3) substantially midway between the stiles (1, 2), the cross member being connected at each end to a respective portion of the leg members, angular movement of the cross member about or with the pivot pin causing one leg member to move outwards relative to its respective stile while the other leg member moves inwards relative to its respective stile.

27 Claims, 3 Drawing Sheets

SELF-LEVELING SUPPORT

This application is a PCT/GB01/04214, filed Sep. 21, 2001.

FIELD OF THE INVENTION

This invention relates to an improved self-leveling support for use in combination with a ladder or platform to provide a stable footing on uneven ground, and to a ladder or platform incorporating such a self-leveling support.

DESCRIPTION OF RELATED ART

Whilst ladders are easy to use on level ground, there is a problem where a ladder is to be used on uneven ground. If the feet of the ladder are not in contact with ground of the same height, the ladder will not stand vertically. A block could be placed beneath one of the feet to make the ladder vertical, but this could lead to instability problems.

SUMMARY OF THE INVENTION

In accordance with a first aspect, the invention provides a self-leveling support comprising:

- a first stile and a second stile;
- a first leg member and a second leg member, each comprising an elongate element adapted to move longitudinally relative to one of the stiles;
- a spacer means adapted to secure the stiles in a fixed relation to each other; and
- a cross member adapted to pivot about or with a pivot pin acting in a guide in the spacer means substantially midway between the stiles, the cross member being connected at each end to a respective portion of the leg members, angular movement of the cross member about or with the pivot pin causing one leg member to move outwards relative to its respective stile whilst the other leg member moves inwards relative to its respective stile.

By inwards we mean movement of the stile to shorten the overall length of the leg and stile. By outwards we mean an increase in overall length.

Each stile may comprise a hollow elongate member. In such a construction each leg member may comprise an elongate member accommodated within the respective stile and adapted to slide relative to the stile. An aperture may be provided in each stile to allow connection of each end of the cross-member to a leg member. The apertures may each comprise an elongated slot. Alternatively, the legs may also comprise hollow members which slide outside of the stiles.

The spacer may fix the stiles parallel to each other.

One or more of the leg members may be received within a foot portion or pad which engages the ground. The foot portion or pad may be removable and serve to increase the cross-sectional area of the leg that engages the ground.

The spacer means may comprise a rung connecting the two stiles. It may further comprise one or more plates attached to the stiles and/or the rung. Two plates are preferably provided, spaced apart by the stiles to define a cavity bounded by the stiles and the rung in which the cross-member is located. The plates are preferably welded to opposite surfaces of the stiles and the rung. A cover may be provided which bounds the remaining side of the cavity. The cover may locate between the plates by, for example, forming a snap-fit between them. The cavity and the cross-member therein is thereby protected from dirt or other foreign particles.

The guide in which the pivot pin is adapted to rotate may comprise an elongate vertical slot. The pivot pin may be adapted to move up and down along the slot as well as rotate. The guide may be provided in the or each plate of the spacer means. The or each slot may be provided with a cap.

The pivot pin may comprise a solid tubular rod which extends orthogonally through the cross-member. It may be retained in position in the cross-member by a grub screw working in a threaded bore in the cross-member. Alternatively, the pivot pin may comprise a pair of integrally formed studs provided on opposing sides of the cross-member.

The cross-member may comprise an elongate beam fabricated from a sheet of metal or a bar.

Fixing means may be provided on the cross-member and the spacer means to retain the cross-member in a predetermined angular position relative to the stiles. The fixing means may come into operation automatically when the predetermined angular position is obtained. The fixing means may come into operation automatically when the self-leveling support is used with the cross-member at the predetermined angular position.

The fixing means may comprise a toothed crescent portion provided on an upper face (or lower face) of the cross member which is adapted to mesh with one or more protrusions or teeth provided on the spacer means, when the pivot pin is at an upper end of the slot or slots in the spacer means.

The protrusions on the spacer means may comprise a crescent of concave form of teeth complementary to the crescent of teeth on the cross-member. The arrangement may be such that more than one tooth on the cross-member engages with more than one tooth on the spacer means regardless of angular orientation of the cross member when the pivot pin is at the upper end of the slot or slots. This provides more strength than a single meshed tooth. Preferably, seven teeth of the cross-member engage with the teeth provided on the spacer means when the fixing means is in operation.

All component parts on the support may be manufactured from steel or aluminium and may be welded or bolted or perhaps glued together.

According to a second aspect, the invention provides a ladder or frame including a support in accordance with the first aspect of the invention. The ladder or frame may be attached to the stiles, or the self-leveling support may be formed as part of the ladder or frame.

The ladder may comprise two opposite stiles connected by rungs, and the base of the stiles of the ladder may be connected to or otherwise co-operate with the stiles of the support. They may engage at least partially within the stiles of the support.

BRIEF DESCRIPTION OF THE DRAWINGS

There will now be described, by way of example only, one embodiment of the present invention with reference to the accompanying drawings in which.

DETAILED DESCRIPTION OF PREFERRED EMBODIMENTS

Figure 1:
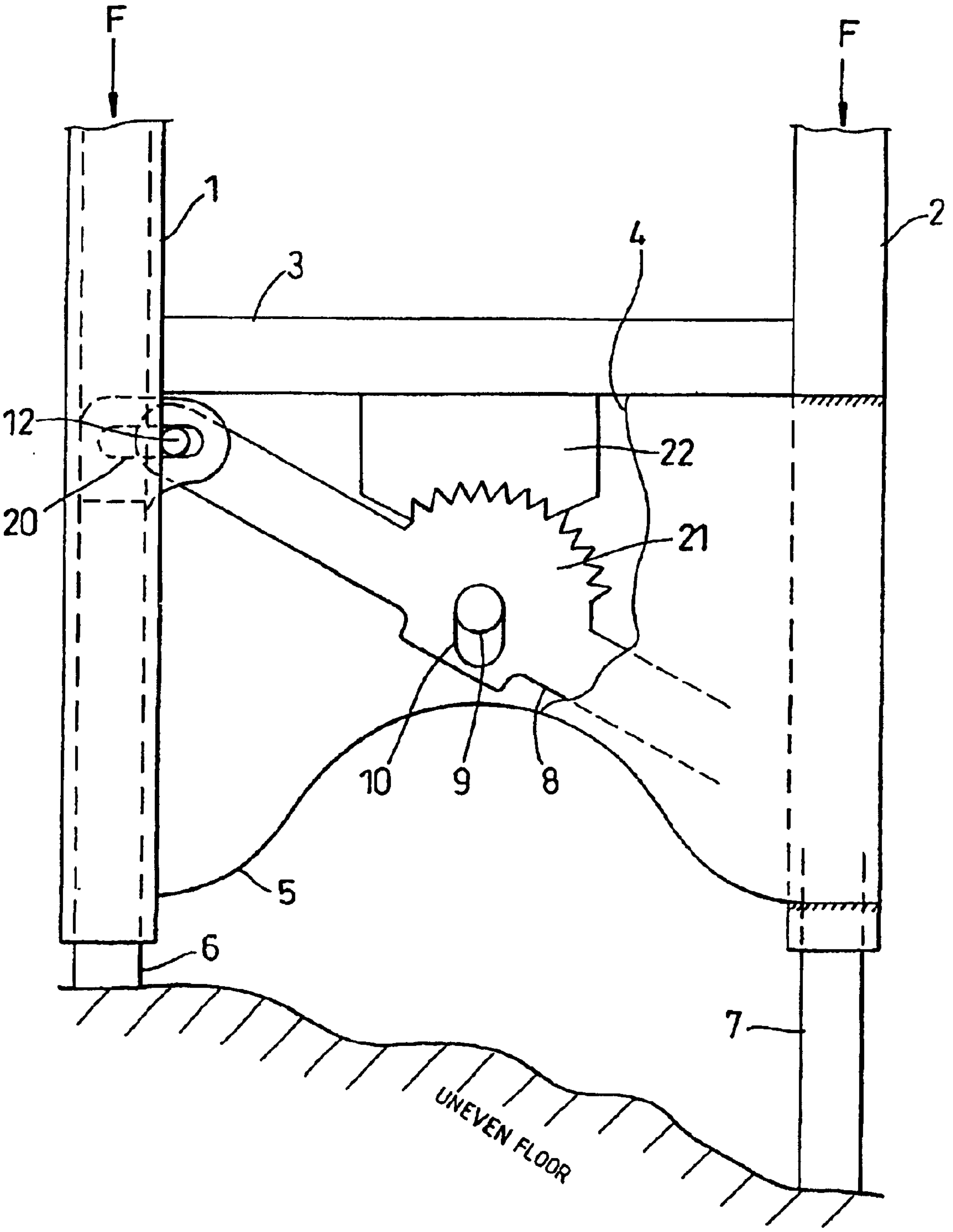
FIG. 1 is a partially cut-away view of a support frame positioned on an uneven ground.

FIG. 1 shows a first embodiment of the invention.

The self-leveling platform comprises a pair of spaced apart elongate stiles 1, 2. The stiles are connected by a rung 3 and a front and back support plate 4, 5 fastened by welding along three sides onto the front and back of the stiles and the rung to define a cavity bounded by the stiles and the rung 3.

Each stile has a hollow tubular cross section (or box-like cross section) over at least its lower portion. An adjustable leg member 6, 7 comprising an elongate member is provided within each hollow stile. The stiles allow the leg member to slide up and down within them so that the amount of leg member protruding from the bottom of each stile can be varied. A rubber foot (not shown) may be provided on the lower end of each leg member.

Of course, in an alternative the stiles may be located within hollow legs rather than outside of the legs.

Figure 3:
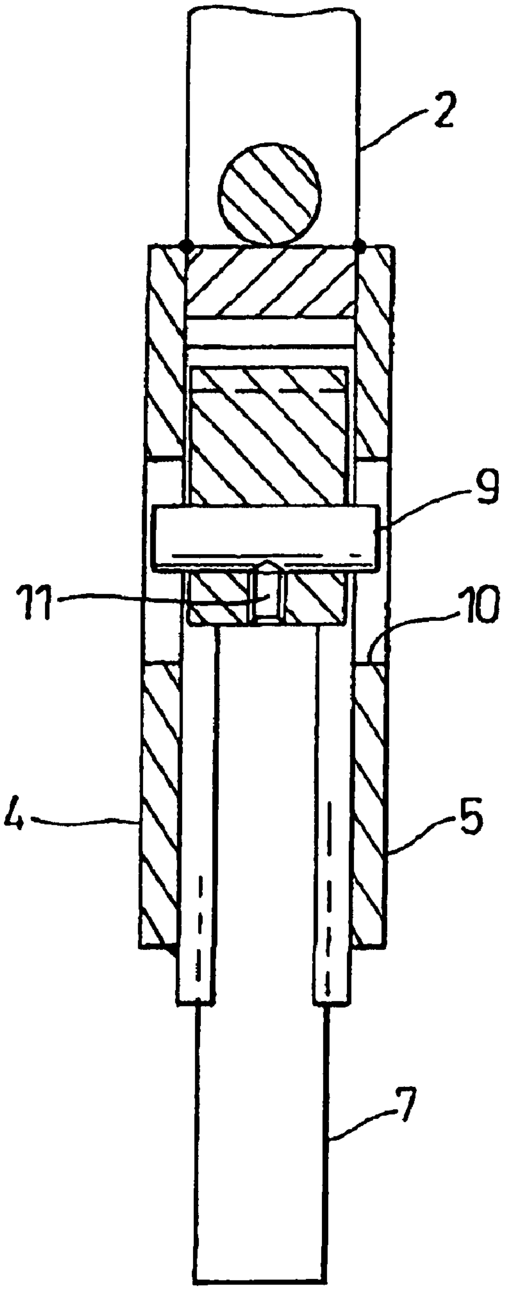
FIG. 3 is a side view of the frame of FIGS. 1 and 2 showing the grub screw locating the pivot pin in the cross member.

An elongate rotatable cross-member 8 is provided which has a centrally located pivot pin 9 extending through an elongate slot 10 provided in the centre of each of the front and back plates midway between the two stiles. The cross member is free to rotate with the pivot pin in a plane containing the stiles and the rung. It can also translate upwards relative to the stiles as the pin moves in the elongate slots which extend parallel to the stiles of the support. A grub screw 11 (seen in FIG. 3) holds the pivot pin 9 onto the cross-member 8. A cap (not shown) is provided over the slot 10.

The cross-member is connected at each end to an uppermost end of a leg member. A transverse pin 12 engages with an elongate slot 20 in the end of the leg member to provide a small amount of free play orthogonal to the main axis of the leg member. An elongate slot (not shown) is provided in each stile to allow its respective leg member to slide up and down within it.

A convex toothed crescent portion 21 of constant radius is provided on the top face of the cross-member 8 having a centre co-incident with the central axis of the pivot pin and hence the axis of rotation of the cross-member 8.

A concave toothed crescent portion 22 is provided on the underside of the rung 3 facing the convex crescent portion 21 on the cross member when the cross member 8 is in a horizontal position. The concave toothed portion 22 is fixed by welding to the rung 3 so that when the pivot pin on the cross-member is moved upwards to the top of the slot 10, one or more teeth on the cross-member engage one or more teeth of the concave crescent portion 22 to prevent further rotation of the cross member. Furthermore, the position of the convex toothed crescent portion 21 is such that when the pivot pin 9 is at the bottom of the slot 10 the teeth do not mesh and the cross-member 8 is free to rotate. For all angular positions of the cross-member, seven teeth of the concave toothed crescent portion 22 mesh with seven teeth on the convex toothed crescent portion 21 when the pivot pin is at the top of the slot 10.

The arrangement is such that when the support is held clear of a surface, the weight of the leg members acting on the end of the cross-member moves the pivot pin to the bottom of the slots in the plates so that the cross-member is free to rotate. If the leg members are substantially identical in weight, they will hang from the cross-member to protrude from the stiles by equal amounts. As the support is lowered onto a surface of uneven height, one foot will contact the ground first and the leg member will be pushed up into its respective stile as the support is lowered further. The cross-member 8 will then rotate which will cause the other foot to move downwards out of its respective stile to contact the ground.

Eventually, on continued downwards movement of the support, both feet will contact the ground. On further downward movement of the support, the cross-member is pushed upwards by the leg members moving in parallel into the stiles, moving the pivot pin to the top of the slots and causing one or more of the teeth of the two crescents to mesh together. The length of each protruding portion of leg member is then fixed. The weight of the support and any ladder or frame thereon causes the cross-member to stay locked.

The elongate slot provided in each stile extends to the bottom of each stile. In this way, if the grub screw 11 is removed, allowing removal of the pivot pin 9, the cross-member 8 together with the leg members 6, 7 may be removed from the support, for inspection, maintenance or replacement of these components.

Figure 2:
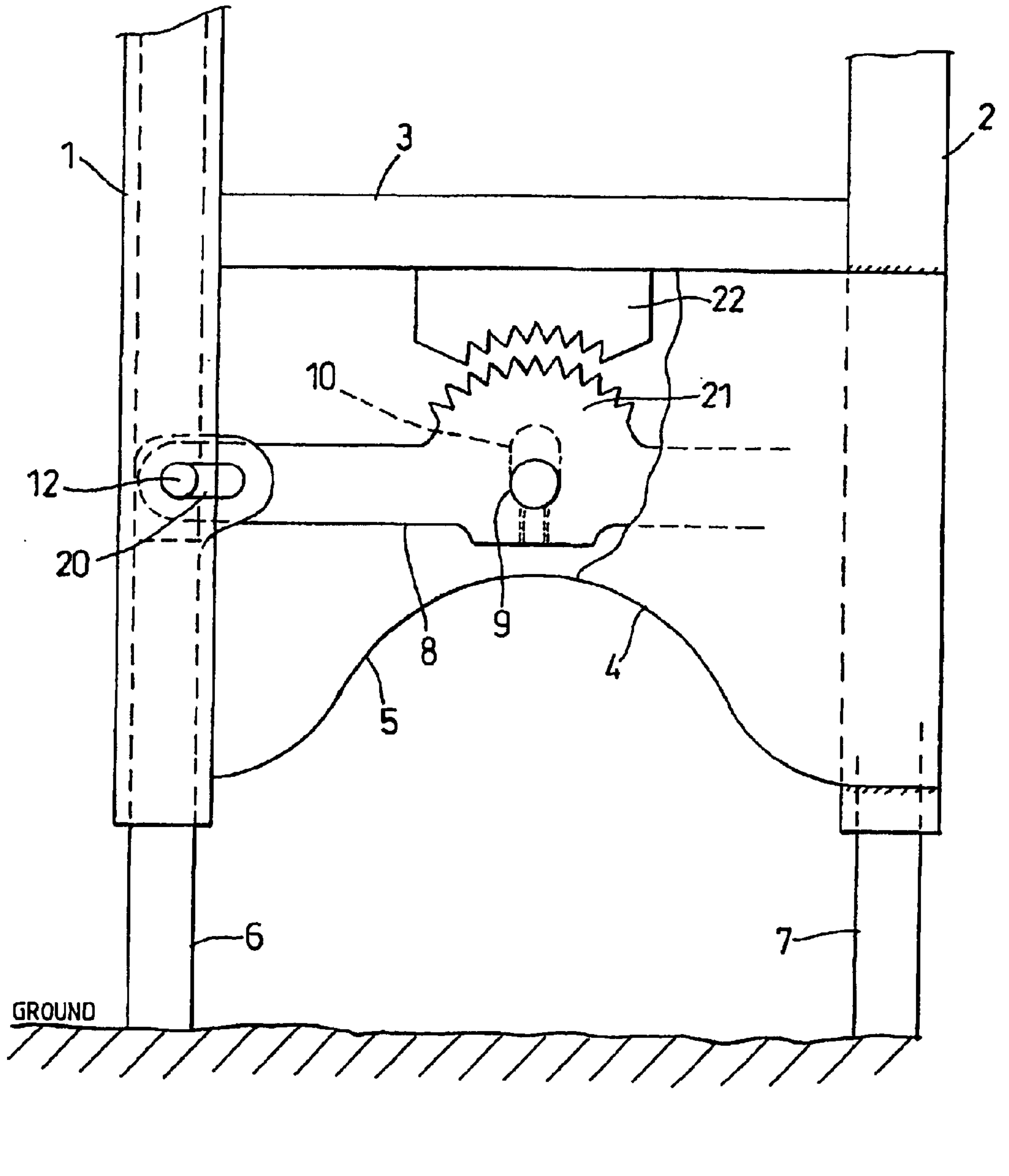
FIG. 2 is a similar partially cut-away view to FIG. 1 with the frame positioned above a level ground and the weight of the frame partially supported before dropping into position.

In a refinement, an opening in a wall of at least one of the stiles may allow a lock pin to be inserted into one of a plurality of receiving holes (not shown) in the leg member to lock the leg member in position. Thus, lifting of the platform will not upset the position of the legs once it has been set and the pin inserted FIG. 2 shows the platform in a position where it is being lowered onto a flat surface. Further lowering of the platform will cause the teeth on the two crescents to intermesh.

FIG. 1 shows the platform in position on an uneven ground with the cross-member locked in place under the weight of the stiles and a load 2F acting down upon the stiles.

What is claimed is:

1. A self-leveling support comprising:

a first stile and a second stile;

a first leg member and a second leg member, each comprising an elongate element adapted to move longitudinally relative to one of the stiles;

a spacer means adapted to secure the stiles in a fixed relation to each other; and a cross member comprising an elongate beam connected to the spacer means substantially midway between the stiles by a pivot pin about which the cross member is adapted to pivot, the beam having two ends, each end being directly connected to a respective portion of the leg members, such that angular movement of the cross member about the pivot pin causes one leg member to move outwards relative to its respective stile whilst the other leg member moves inwards relative to its respective stile.

2. The self-leveling support according to claim 1, further comprising a first locking element on the spacer and a second locking element on the cross member, wherein the first and second locking elements are moveable relative to each other in a direction parallel to the stiles whereby the first and second locking members are automatically engaged to lock the cross member against rotation relative to the spacer when a vertically downward load is applied to the cross member.

3. A self-leveling support comprising:

a first stile and a second stile;

a first leg member and a second leg member, each comprising an elongate element adapted to move longitudinally relative to one of the stiles;

a spacer means adapted to secure the stiles in a fixed relation to each other; and a cross member connected to the spacer means substantially midway between the stiles by a pivot pin about which the cross member is adapted to pivot, the cross member being connected at each end to a respective portion of the leg members, such that angular movement of the cross member about the pivot pin causes one leg member to move outwards relative to its respective stile whilst the other leg member moves inwards relative to its respective stile, wherein an aperture is provided in each stile to allow connection of each end of the cross-member to a leg member.

4. The self-leveling support according to claim 3 in which the apertures each comprise an elongated slot.

5. The self-leveling support according to claim 3, in which one or more of the leg members is received within a foot portion or pad which engages the ground.

6. The self-leveling support according to claim 3, in which the spacer means comprises a rung connecting the two stiles.

7. The self-leveling support according to claim 3, in which the guide in which the pivot pin is adapted to rotate comprises an elongate vertical slot.

8. The self-leveling support according to claim 7 in which the pivot pin is adapted to move up and down along the slot as well as rotate.

9. The self-leveling support according to claim 3, in which the pivot pin comprises a solid tubular rod which extends orthogonally through the cross-member.

10. The self-leveling support according to claim 3, in which a fixing means is provided on the cross-member and the spacer means to retain the cross-member in a predetermined angular position relative to the stiles when the predetermined angular position is obtained.

11. The self-leveling support according to claim 10 in which the fixing means comprises a toothed crescent portion provided on a face of the cross-member which is adapted to mesh with one or more protrusions or teeth provided on the spacer means, when the pivot pin is at an upper end of the slot or slots in the spacer means.

12. The self-leveling support according to claim 11 in which the protrusions on the spacer means comprise a crescent of concave form of teeth complementary to the crescent of teeth on the cross-member.

13. The self-leveling support according to claim 3, in which each stile comprises a hollow elongate member and the elongate element of each leg member is accommodated within the hollow elongate member of each respective stile and adapted to slide relative to the stile.

14. A self-leveling support comprising:

a first leg member and a second leg member, each comprising an elongate element adapted to move in a longitudinal direction relative to a frame or ladder, the first leg and second leg being separated by a fixed spacing relative to each other in a direction substantially orthogonal to the longitudinal direction;

a cross member slidably and pivotally attached to each of the first and second leg members, the cross member further adapted to pivot substantially midway between the first and second legs, such that angular movement of the cross member about a pivot point causes one leg member to move outwards relative to its respective portion of the frame or ladder whilst the other leg member moves inwards relative to its respective portion of the frame or ladder; and a fixing means having a toothed crescent portion provided on the cross-member to retain the cross-member in a predetermined angular position relative to the legs when the predetermined angular position is obtained and meshed with one or more protrusions or teeth provided on a corresponding toothed crescent portion fixedly provided on the frame or ladder.

15. The self-leveling support according to claim 14 in which the one or more protrusions comprise a crescent of concave form of teeth complementary to the crescent of teeth on the cross-member.

16. The self-leveling support according to claim 14 wherein slidable and pivotal connections between the frame or ladder and the legs are provided by pins in oval-shaped slots.

17. The self-leveling support according to claim 14 wherein slidable and pivotal connections between the frame or ladder and the cross member are provided by a pin in an oval-shaped slot.

18. A self-leveling support comprising:

a first stile and a second stile;

a first leg slidably mounted to the first stile for movement longitudinally of the first stile;

a second leg slidably mounted to the second stile for movement longitudinally of the second stile;

a spacer secured the stiles to maintain the stiles in a fixed relation to each other;

a cross member comprising an elongate beam pivotally connected to the spacer substantially midway between the stiles, the beam being connected at each end directly to a respective portion of a respective leg whereby angular movement of the cross member about the pivot causes one leg to move outwards relative to its respective stile whilst the other leg member moves inwards relative to its respective stile; and means for locking the position of the legs relative to their respective stiles; wherein the locking means comprises a first locking element on the spacer and a second locking element on the cross member, the first and second locking elements being disengageable from each other to permit pivotal movement of the cross member relative to the spacer and being engageable with each other to lock the cross member against rotation relative to the spacer and thereby lock the legs against longitudinal movement relative to the stiles.

19. The self-leveling support according to claim 18, in which each stile comprises a hollow elongate member and each leg comprises and elongate member accommodated within the respective stile and adapted to slide relative to the stile.

20. The self-leveling support according to claim 18, in which an aperture is provided in each stile to allow connection of each end of the cross member to a respective leg.

21. The self-leveling support according to claim 18, in which one or more of the legs is received within a foot portion or pad which engages the ground.

22. The self-leveling support according to claim 18, in which the pivotal connection between the cross member and the spacer is provided by a pivot pin which is secured to the cross member and acts in an elongate vertical slot in the spacer.

23. The self-leveling support according to claim 22, in which the pivot pin comprises a solid tubular rod which extends orthogonally through the cross member.

24. The self-leveling support according to claim 18, in which the second locking element comprises a toothed crescent portion provided on an upper face or lower face of the cross member and the first locking element comprises one or more protrusions or teeth provided on the spacer means.

25. The self-leveling support according to claim 24, in which the protrusions on the spacer means comprise a crescent of concave form of teeth complementary to the crescent of teeth on the cross member.

26. The self-leveling support according to claim 18, wherein the stiles are the stiles of a ladder.

27. The self-leveling support according to claim 18, wherein the first and second locking elements are movable relative to each other in a direction parallel to the stiles whereby the first and second locking members are automatically engaged when a vertically downward load is applied to the cross member.

* * * * *